US008928737B2

United States Patent
Christopher et al.

(10) Patent No.: US 8,928,737 B2
(45) Date of Patent: Jan. 6, 2015

(54) SYSTEM AND METHOD FOR THREE DIMENSIONAL IMAGING

(75) Inventors: Lauren Ann Christopher, Indianapolis, IN (US); Mangilal Agarwal, Indianapolis, IN (US); Weixu Li, Indianapolis, IN (US)

(73) Assignee: Indiana University Research and Technology Corp., Indianapolis, IN (US)

( * ) Notice: Subject to any disclaimer, the term of this patent is extended or adjusted under 35 U.S.C. 154(b) by 405 days.

(21) Appl. No.: 13/559,287

(22) Filed: Jul. 26, 2012

(65) Prior Publication Data

US 2013/0188019 A1 Jul. 25, 2013

Related U.S. Application Data

(60) Provisional application No. 61/511,774, filed on Jul. 26, 2011, provisional application No. 61/557,146, filed on Nov. 8, 2011.

(51) Int. Cl.
  *H04N 13/02* (2006.01)

(52) U.S. Cl.
  CPC ......... *H04N 13/025* (2013.01); *H04N 13/0235* (2013.01); *H04N 13/0271* (2013.01)
  USPC ............. 348/46; 348/42; 348/43; 348/45; 348/47; 348/48; 348/49; 348/50; 348/52; 348/53; 348/54; 348/65; 348/159; 348/160; 348/161; 348/211.14; 348/218.1; 348/230.1; 348/231.99; 348/236; 348/237; 348/238; 348/239; 348/272; 348/294; 348/298; 348/308; 348/345; 348/348; 348/567; 348/714; 348/716; 348/719

(58) Field of Classification Search
  USPC .......... 348/46, 42, 43, 45, 47, 48, 49, 50, 52, 348/53, 54, 65, 159, 160, 161, 211.1, 218.1, 348/230.1, 231.99, 236, 237, 238, 239, 272, 348/294, 298, 308, 345, 348, 567, 714, 716, 348/719
  See application file for complete search history.

(56) References Cited

U.S. PATENT DOCUMENTS

| | | | |
|---|---|---|---|
| 5,864,360 A * | 1/1999 | Okauchi et al. | 348/47 |
| 6,094,215 A * | 7/2000 | Sundahl et al. | 348/42 |
| 8,218,061 B2 | 7/2012 | Baxansky | |
| 8,264,541 B2 * | 9/2012 | Chen et al. | 348/159 |

(Continued)

OTHER PUBLICATIONS

A. Pentland, "A New Sense for Depth of Field", IEEE Trans. Pattern Anal. Machine intell., vol. 9, pp. 523-531, 1987.

(Continued)

*Primary Examiner* — Jefferey Harold
*Assistant Examiner* — Mustafizur Rahman
(74) *Attorney, Agent, or Firm* — Maginot Moore & Beck LLP (57) ABSTRACT

A method of operating a camera with a microfluidic lens to identify a depth of an object in image data generated by the camera has been developed. The camera generates an image with the object in focus, and a second image with the object out of focus. An image processor generates a plurality of blurred images from image data of the focused image, and identifies blur parameters that correspond to the object in the second image. The depth of the object from the camera is identified with reference to the blur parameters.

20 Claims, 5 Drawing Sheets

(56) References Cited

U.S. PATENT DOCUMENTS

| | | | |
|---|---|---|---|
| 2003/0151659 A1* | 8/2003 | Kawano et al. | 348/42 |
| 2006/0221179 A1* | 10/2006 | Seo et al. | 348/46 |
| 2008/0031327 A1* | 2/2008 | Wang et al. | 375/240.12 |
| 2008/0062278 A1* | 3/2008 | Khan et al. | 348/231.3 |
| 2008/0117289 A1* | 5/2008 | Schowengerdt et al. | 348/46 |
| 2008/0198220 A1* | 8/2008 | Chen et al. | 348/47 |
| 2010/0097444 A1* | 4/2010 | Lablans | 348/46 |
| 2010/0182406 A1* | 7/2010 | Benitez | 348/46 |
| 2010/0194870 A1 | 8/2010 | Ghita et al. | |
| 2010/0309288 A1* | 12/2010 | Stettner et al. | 348/43 |
| 2010/0309292 A1* | 12/2010 | Ho et al. | 348/47 |
| 2011/0050864 A1* | 3/2011 | Bond | 348/51 |
| 2011/0169921 A1* | 7/2011 | Lee et al. | 348/46 |

OTHER PUBLICATIONS

A. Horii, "Depth from Defocusing", tech. rep., Computational Vision and Active Perception Laboratory, Royal Institute of Technology, 1992.

Kapoor et al., "Depth and Image Recovery using Markov Random Field", IEEE Trans. Pattern Anal. Machine intell., vol. 16, pp. 1117-1122, 1994.

Ens et al., "An Investigation of Methods for Determining Depth from Focus", IEEE Trans. Pattern Anal. Machine intell., vol. 15, pp. 97-107, 1993.

Geman et al., "Stochastic Relaxation, Gibbs Distribution and the Bayesian Distribution of Images", IEEE Trans. Pattern Anal. Machine intell., vol. 6, pp. 721-741, 1984.

Hung et al., "Model-Based Segmentation and Estimation of 3D Surface from Two or More Intensity Images using Markov Random Fields", IEEE International Conference on Pattern Recognition, pp. 390-397, 1990.

M. Subbarao, "Efficient Depth Recovery through Inverse Optics", Machine Vision for Inspection and Measurement, pp. 101-126, Academic Press, 1989.

Surya et al., "Depth from defocus by changing camera aperature: A spatial domain approach", 1993.

Rowe et al., "Bayesian Factor Analysis by Gibbs Sampling and Iterated Conditional Modes", 1994.

Mitter et al., "Probabalistic Solution of Ill-Posed Problems in Computational Vision", Journal of the American Statistical Association, vol. 82, pp. 76-89, 1987.

T. Garnier, "The Liquid Lens Technology", http://www.varioptic.com/media/uploads/publication/varioptic_liquid_lens_technology_2010_12_02.pdf, available prior to Jul. 25, 2012 (2 pages).

J. Canny, "A Computational Approach to Edge Detection", IEEE Trans. Pattern Anal. Machine intell., vol. 8, pp. 679-698, 1986.

Namboodiri et al., "Regularized Depth from Defocus", IEEE 15th International Conference on Image Processing, pp. 1520-1523, 2008.

Gabay et al., Dynamic study of a Varioptic variable focal lens, Proceedings of SPIE, vol. 4767, 2002.

B. Berge, Liquid Lens Technology: Principle of Electrowetting based lenses and applications to imaging, Proceedings of the MEMS 2005 conference, 2005.

Berge et al., Variable focal lens controlled by an external voltage: an application of Electrowetting, European Physics Journal, vol. 3, pp. 159-163.

Sahay et al., "Harnessing defocus blur to recover high-resolution information in shape-from-focus technique", IET Computer Vision, vol. 2, pp. 50-59, 2008.

Day et al., "Three-dimensional sensing based on a dynamically focused laser optical feedback imaging technique", Applied Optics, vol. 40, pp. 1921-1924.

Held et al., "Markov random field segmentation of brain MR images", IEEE Transactions on Medical Imaging, vol. 16, No. 6, 1997.

Pohl et al., "Anatomical guided segmentation with non-stationary tissue class distributions in an expectation-maximization framework", IEEE International Symposium on Biomedical Imaging: from Micro to Nano, 2004.

Krucker et al., "3D spatial compounding of ultrasound images using image-based nonrigid registration", Ultrasound in Medicine and Biology, vol. 26, No. 9, pp. 1475-1488, 2001.

Pieper et al., "3D Slicer", Proceedings of the 1st IEEE International Symposium on Biomedical Imaging: From Nano to Macro, pp. 632-635, 2004.

Yoav et al., "An iterative Bayesian approach for liver analysis: tumors validation study", MICCAI Grand Challenge (Online), http://hdl.handle.net/10380/1405, Sep. 2008.

Rannou et al., "New Expectation Maximization Segmentation Pipeline in Slicer 3", Insight Journal, pp. 1-47, Sep. 2009.

Marroquin et al., "An accurate and efficient Bayesian method for automatic segmentation of brain MRI", IEEE Transactions on Medical Imaging, vol. 21, No. 8, 2002.

J. Besag, "On the statistical analysis of dirty pictures", Journal of Royal Statistical Society Series B, vol. 48, No. 1, 1986.

Comer et al., "The EM-MPM algorithm for segmentation of textured images: Analysis and further experimental results", IEEE Transactions on Image Processing, vol. 9, No. 10, 2000.

Nedzved et al., "Augmented 3D Endoscopic Video", 3DTV-CON'08, 2008.

Varioptic SA, "Liquid Lens Developer Kits," Dec. 2010 (3 pages).

Christopher, Lauren A. et al., "New Approaches in 3D Ultrasound Segmentation," Proceedings SPIE and IST Electronic Imaging and Technology Conference, 2003 (15 pages).

* cited by examiner

SYSTEM AND METHOD FOR THREE DIMENSIONAL IMAGING

CLAIM OF PRIORITY

This patent claims priority to U.S. provisional patent application Ser. No. 61/511,774, which was filed on Jul. 26, 2011, and is entitled "2D PLUS DEPTH VIDEO CAMERA USING DEPTH FROM DEFOCUS IMAGING AND A SINGLE MICROFLUIDIC LENS," the entire disclosure of which is expressly incorporated by reference herein. This patent claims further priority to U.S. provisional patent application Ser. No. 61/557,146, which was filed on Nov. 8, 2011, and is entitled "SYSTEM AND METHOD FOR THREE DIMENSIONAL IMAGING," the entire disclosure of which is expressly incorporated by reference herein.

TECHNICAL FIELD

The present disclosure relates generally to methods and systems for generating still and video images, and, more particularly, to a method and system for identifying a depth of an object in a field of view of a single camera.

BACKGROUND

The production of three-dimensional or "3D" images, including both single-frame and video images, has applications in many fields including science, medicine, and entertainment. In some instances, the 3D images are displayed to a viewer with a two-dimensional display such as a television or movie screen. The display modifies the two-dimensional image to enable the viewer to perceive a 3D image on the screen. In other applications, three-dimensional data are extracted from a two dimensional image. For example, the distance or depth of an object as viewed from a camera can be identified in three dimensional image data for a variety of uses. Computerized systems including machine vision systems used in medical and industrial applications utilize depth information and other three-dimensional data generated from 3D image data even if a human does not view the 3D images.

Traditional 3D imaging systems include two cameras that generate binocular images in much the same way that humans perceive three-dimensional environments with both eyes. Two corresponding images from each camera combine into a composite image using various techniques known to the art to enable a viewer to perceive three-dimensions from a two-dimensional image. In some embodiments, the viewer views both two-dimensional images simultaneously with one eye viewing each image. The two cameras used in traditional 3D imaging systems, however, increase the size and complexity of the imaging system. For example, both cameras have to be properly aligned and focused to generate two appropriate images that can be combined to produce a 3D composite image.

An alternative imaging technique referred to as "depth from defocus" produces three-dimensional image data using a single camera. In a depth from defocus system, a single camera generates two images of a single scene. One image of the scene focuses on an object within the scene, while the camera is defocused from the object in the second image. The depth from defocus technique identifies the amount of blur that is introduced between the focused image and the defocused image. Once the depth from defocus technique identifies the blur, represented by the term a, the depth of the object D in the two images can be identified using the following equation:

$$D = \frac{-v}{\left(\frac{\sigma}{\rho r} - \frac{v}{f} + 1\right)}$$

where r is a radius of the lens aperture of the camera, v is a distance between the lens and the image sensor in the camera, f is the focal length of the optics in the camera (depicted in FIG. 3A and FIG. 3B), and ρ is a predetermined camera constant. The depth from defocus technique generates a "depth map" that includes a data corresponding to the depths of various objects and regions depicted in an image.

While the depth from defocus technique enables a single camera to generate three-dimensional image data, existing imaging systems using the depth from defocus technique also have limitations in practical use. Since the depth from defocus technique uses two different images of a single scene, the camera changes focus and generates two different images at two different times. In a static scene with no moving objects the two images depict the same scene, but the two images may not correspond to each other and the depth data cannot be calculated accurately in a dynamic scene with moving objects. For similar reasons, the depth-from-defocus technique presents challenges to video imaging applications that typically generate images at a rate of 24, 30, or 60 frames per second. In a depth from defocus imaging system, the camera generates two images for each standard frame of video data at a corresponding rate of 48, 60, or 120 images per second, respectively, and the camera changes focus between each pair of images. Existing imaging systems have difficulty in changing the focus of the lens and in generating three-dimensional image data with the depth-from-defocus technique to generate video at commonly used frame rates. Consequently, improvements to imaging systems that increase the imaging speed of a camera generating three-dimensional image data would be beneficial.

SUMMARY

In one embodiment, a method of identifying depth information in an image has been developed. The method includes focusing a microfluidic lens in a camera on an object in a field of view of the camera, generating first image data of the field of view that includes a first plurality of pixels corresponding to the object on which the microfluidic lens was focused, defocusing the microfluidic lens in the camera from the object, generating second image data that includes a second plurality of pixels corresponding to the object on which the microfluidic lens was defocused, generating a plurality of blurred images from the first image data with an image data processor. Each blurred image in the plurality of blurred images is generated with one blur parameter value in a predetermined plurality of blur parameter values. The method includes generating, with the image data processor, a plurality of blur parameters with reference to the second plurality of pixels and the plurality of blurred images, each blur parameter in the plurality of blur parameters corresponding to one pixel in the first plurality of pixels, identifying, with the image data processor, a depth of the object from the camera in the first image data with reference the plurality of blur parameters, and generating a video frame including the first image data and a depth map corresponding to a portion of the first image data and the identified depth of the object from the camera prior to generation of a subsequent video frame.

In another embodiment, a digital imaging system has been developed. The system includes a camera having a microfluidic lens an image detector, and an image data processor. The microfluidic lens is configured to have a range of focus distances and the image detector is configured to generate image data corresponding to light reaching the image detector through the microfluidic lens. The image data processor is operatively connected to the microfluidic lens and the image detector in the camera. The image data processor is further configured to focus the microfluidic lens on an object within a field of view of the camera, generate first image data that includes a first plurality of pixels corresponding to the object on which the microfluidic lens was focused, defocus the microfluidic lens from the object, generate second image data that includes a second plurality of pixels corresponding to the object on which the microfluidic lens was defocused, generate a plurality of blurred images from the first image data, each blurred image in the plurality of blurred images being generated with one blur parameter value in a predetermined plurality of blur parameter values, generate a plurality of blur parameters with reference to the second plurality of pixels and the plurality of blurred images, each blur parameter in the plurality of blur parameters corresponding to one pixel in the first plurality of pixels, and identify a depth of the object from the camera in the first image data with reference to the plurality of blur parameters.

DETAILED DESCRIPTION

The description below and the accompanying figures provide a general understanding of the environment for the system and method disclosed herein as well as the details for the system and method. In the drawings, like reference numerals are used throughout to designate like elements. As used herein, the term "pixel" refers to a single element in an image that includes data corresponding to a single two-dimensional location in the image. A typical image is formed from a two-dimensional array of pixels. In color images, a pixel typically includes one or more numeric values corresponding to the intensity of various colors in the image data, including red green blue (RGB) intensity values in commonly used image formats. In a grayscale image format, each pixel includes an intensity value corresponding to the level of light detected for the pixel in the image. Digital cameras are cameras that are configured to generate digital representations images including numeric values assigned to pixels in an image. Digital cameras and image data processing devices that generate and process color and grayscale image formats can be incorporated with the systems and methods described below.

A video camera generates a plurality of images at different times, and the images taken together form a video rendition of a scene. Each image in a video is referred to as a "frame" and various standards for video generation specify that a predetermined number of image frames be generated every second to produce a video with acceptable playback quality. Some video formats specify a frame rate of 24, 30, or 60 frames per second (FPS). In one example, so-called "high definition" video formats with frame resolutions of 1280×720 pixels or 1920×1080 pixels specify frame rates of 60 frames per second.

As used herein, the term "depth map" refers to a plurality of values corresponding to the "depth" or distance between a camera and an object in an image that the camera generates. In one embodiment, a depth map includes a depth value corresponding to an estimated depth of each pixel in an image. In other embodiments, an image segmentation algorithm decomposes the image into one or more segments and the depth map includes a depth value assigned to pixels within each segment in the image.

Figure 1:
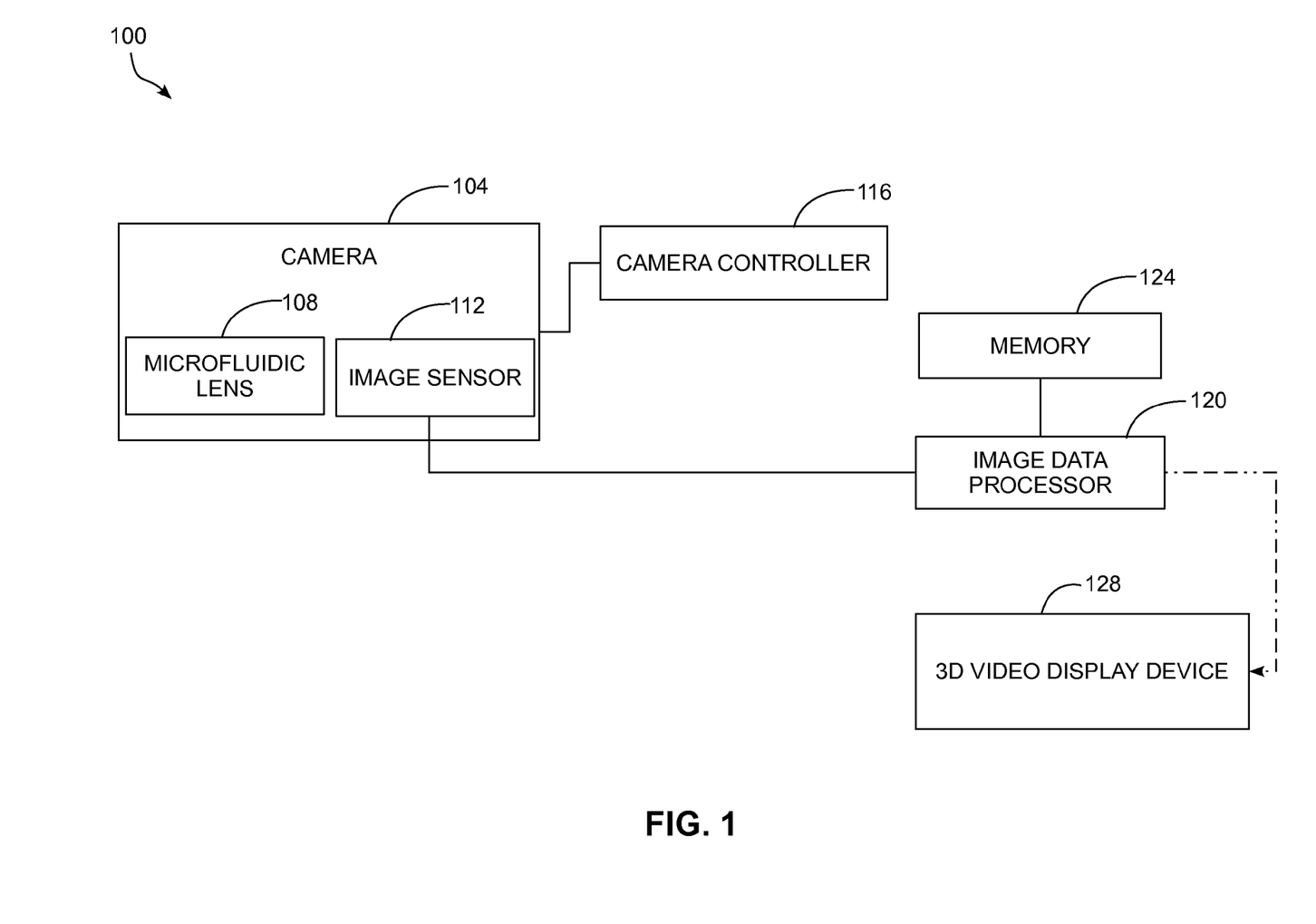
FIG. 1 is a schematic diagram of an image acquisition and processing system.

FIG. 1 depicts an image acquisition and processing system 100 that is configured to generate video image data and to generate depth maps of each frame in the generated video. The system 100 includes a camera 104, camera controller 116, image data processor 120, and memory 124. The camera controller 116 controls the focus and operation of the camera 104 to generate digital images of a scene, and the image data processor 120 receives the digital image data to generate depth maps from two or more digital images generated by the camera 104.

The camera 104 includes a lens 108 and image sensor 112. In the embodiment of FIG. 1, the camera 104 is a digital camera, which includes a digital image sensor 112. Exemplary embodiments of the image sensor 112 include charged coupled device (CCD) sensors, complementary metal oxide semiconductor (CMOS) sensors, and any other sensor that is configured to generate image data from light permitted through the lens 108.

Figure 5A:
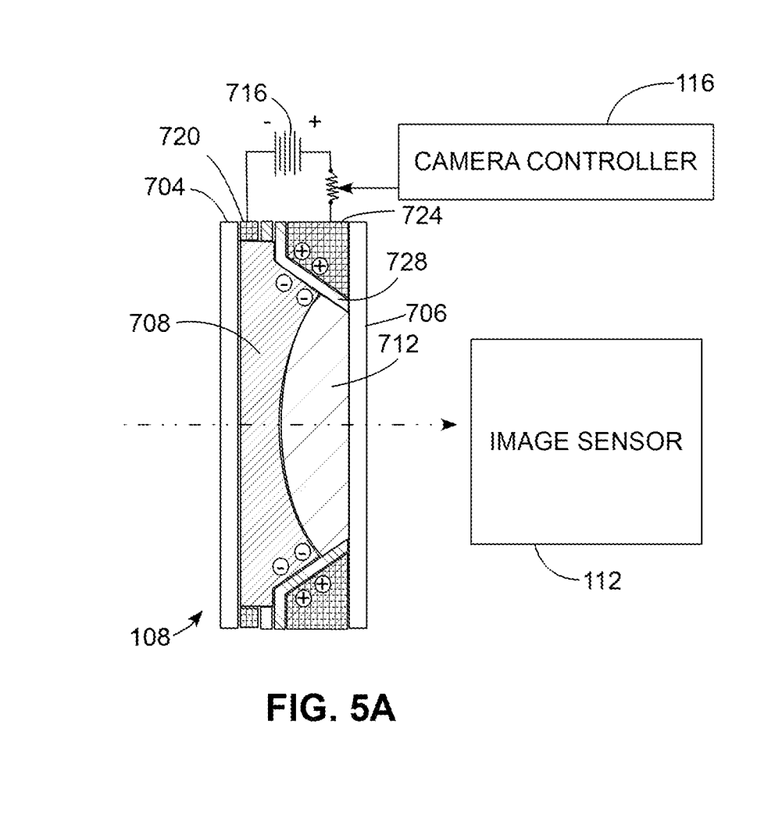
FIG. 5A is a cross-sectional view of an exemplary microfluidic lens that is connected to an electrical power source.

The lens 108 in the camera 104 is a microfluidic lens, also referred to as an electrowetting lens. The lens 108 is depicted in more detail in FIG. 5A and FIG. 5B. The lens 108 includes two glass layers 704 and 706 that sandwich immiscible volumes of water 708 and oil 712. The water 708 adheres to a hydrophilic coating on the glass layer 704. Light enters the lens 108 through the glass layer 704, water layer 708, oil layer 712, and exits through the glass layer 706 to be detected by the image sensor 112. In the configuration of FIG. 5A, an electrical power source 716 supplies an electrical voltage to conductors 704 and 724. In some embodiments the electrical power source 716 is an alternating current (AC) electrical power source. The electrical conductor 720 contacts the water 708, and an electrical insulator 728 arranged around the circumference of the lens separates the electrical conductor 724 from the water 708 and oil 712. The electrical voltage generates a charge gradient that attracts ions in the water 708 toward the electrical insulator 728, with the water 708 forming a concave shape. The oil 712 forms a convex shape as depicted in FIG. 5A as the water 708 is attracted towards the sides of the lens around the insulator 728.

Figure 5B:
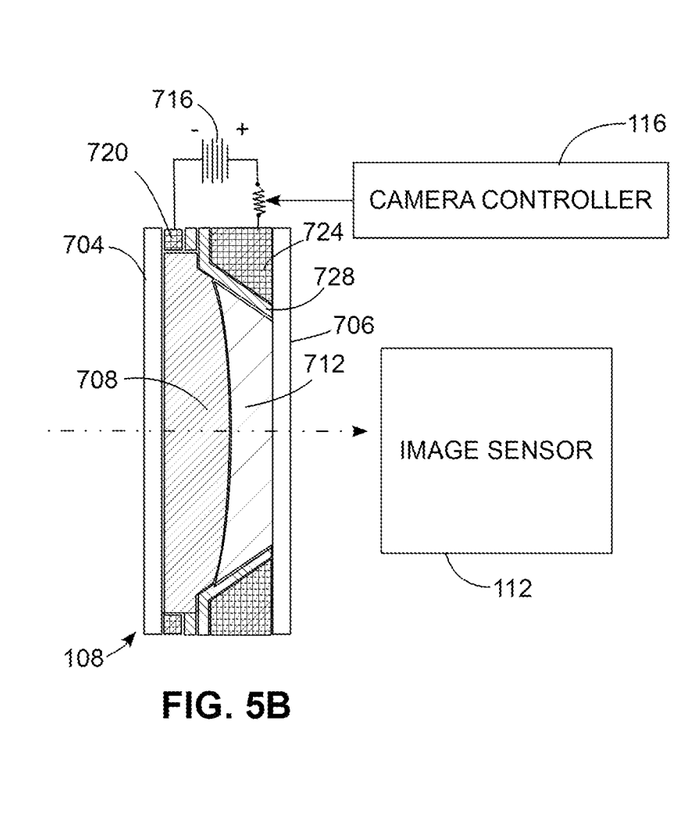
FIG. 5B is a cross-sectional view of the microfluidic lens of FIG. 5A when disconnected from the electrical power source.

In FIG. 5A and FIG. 5B, the camera controller 116 controls the level of electrical voltage supplied to the conductors 720 and 724 using a potentiometer, although alternative configurations use a voltage regulator or other electrical circuits that control level of electrical voltage applied to the lens 108. The level of voltage supplied to the electrical conductors 720 and 724 affects the shape of the water 708 and oil 712 in the lens 108. The focus of the lens 108 is controlled by the shapes of the water 708 and oil 712. Thus, the camera controller 116 can change the focus of the lens 108 by controlling the level of voltage supplied to the lens 108.

FIG. 5B depicts the lens 108 when the camera controller 116 effectively disconnects the electrical power source 716 from the electrical conductors 720 and 724. In the configuration of FIG. 5B, the ions in the water 708 are not attracted to the electrically charged conductor 724, and the water 708 forms a convex shape with the oil 712 forming a concave shape. The configurations of FIG. 5A and FIG. 5B depict the lens 108 at two extreme focus settings, with either a minimum or maximum focal length for the lens 108. In the example of FIG. 5A and FIG. 5B, the lens 108 has a focus range of −5 to 13 diopters, with the low voltage corresponding to −5 diopters with the lens having a concave shape, and the high voltage corresponding to 13 diopters with the lens having an oval/spherical shape. As is known in the art, the focal length of the lens is inversely proportional to the diopter number. Thus, the lens 108 has both a positive and negative range of focal lengths. In the positive range, the maximum focal length is effectively infinity when the lens 108 is focused at zero diopters and the water 708 and oil 712 are arranged in a planar configuration that is neither concave nor convex. The minimum focal length in the positive range is approximately 7.7 cm (13 diopters) when the lens 108 is in the convex configuration depicted in FIG. 5B.

In the negative range, the maximum focal length of the lens 108 is also infinity when the lens 108 is focused at zero diopters. The minimum negative focal length of the lens 108 is approximately −20 cm in the concave configuration of FIG. 5A. During operation, the lens 108 can change focus in either the positive focus range, the negative focus range, or can transition between the positive and negative focus ranges. During operation, the camera controller 116 adjusts the level of electrical voltage applied to the lens 108 to adjust the focus of the lens 108 to a plurality of intermediate focus lengths between the minimum and maximum focus lengths within either or both of the positive and negative focus ranges.

Microfluidic lenses, such as lens 108, offer a comparatively rapid response time when changing the focus of the lens. In one commercially available embodiment, the time to change between the concave configuration of FIG. 5A and the convex configuration of FIG. 5B is 30 milliseconds, with an additional settling time of approximately 40 milliseconds to allow the water 708 and oil 712 in the lens to settle. During operation, the microfluidic lens 108 transitions between a smaller range of diopter settings and corresponding focal lengths to enable the lens to change between at least two focus settings during each frame of a video recorded at a frame rate of 24, 30, or 60 FPS. In one exemplary configuration, the lens 108 changes between a zero diopter (infinite) focus and a focus of one diopter to generate the focused and defocused images, respectively. The focus settings of the lens 108 enable the lens 108 to change focus in less time than the period of a single frame in the video. In the case of a 24 FPS video, the time is less than approximately 41.7 milliseconds, and in the case of a 60 FPS video, the time is less than approximately 16.7 milliseconds. Additionally, the focus range enables sufficient change in focus of a scene to generate a depth map of the scene while also generating images that are sufficiently focused to enable the image data process 120 to accurately identify blur parameters that correspond to pixels in the defocused image data.

The camera controller 116 can be implemented as a specialized electronic control unit configured that operates the camera 104 to generate video images. In another embodiment, the camera controller 116 is implemented as programmed instructions stored in a memory of a computing device that executes the instructions to generate command signals that operate the camera 104. In one embodiment, the camera controller 116 operates the camera 104 to generate two images for each frame of a video. The controller 116 changes the focus of the lens 108 between generation of the first image and second image during each frame. The camera controller 116 operates the image sensor 112 to generate digital data for the first and second images after focusing the lens 108. In other embodiments, the controller 116 operates the camera 104 to generate three or more images for each frame of the video, with the lens 108 being focused at a different focus setting for each image in the frame. As described in more detail below, the image acquisition and processing system 100 uses the images generated at each focus setting to generate a depth map for each frame in the video.

The image data processor 120 receives digital image data from the image sensor 112 in the camera 104 and generates depth map data for multiple images in each frame of a video. One embodiment of the image data processor 120 includes a computing device with a general purpose central processing unit (CPU) that is operatively connected to a specialized computing device such as a field programmable gate array (FPGA), application specific integrated circuit (ASIC), or a digital signal processor (DSP). The specialized computing device includes hardware that is configured to perform various operations to generate depth maps from the image data. Additionally, the FPGA, ASIC, or DSP can filter the image data to reduce noise and perform segmentation and edge detection processes on the image data, either alone or in combination with the CPU. Another embodiment of the image data processor 120 includes a CPU and a general purpose graphical processing unit (GPGPU) that are configured with software to generate the depth maps. Some embodiments of the image data processor include parallel processing components including one or more multi-core CPUs and GPUs, and various computing devices that employ single instruction multiple data (SIMD) or multiple instruction multiple data (MIMD) processing techniques. In still other embodiments, the image data processor 120 is a network of multiple computing devices that process the video image data in a distributed manner. Various embodiments of the image data processor 120 are configured for "real time" generation of the depth map information substantially concurrently with the generation of the video images, or are configured to generate the depth maps after a video is recorded.

The image data processor 120 is operatively coupled to a memory 124. In one embodiment, the memory 124 includes both a volatile memory device, such as dynamic or static random access memory (RAM), and a non-volatile memory device, such as a magnetic disk or solid-state storage device. In one configuration, the volatile memory stores programmed instructions and buffers intermediate data, such as image data, from the camera 104 and intermediate images that are generated during a depth from defocus process to generate depth maps for the video data. The non-volatile storage device can store the entire video sequence and the depth maps generated for each frame in the video sequence.

In the embodiment of FIG. 1, an optional three-dimensional (3D) display device 128 is configured to display 3D images and video generated by the image data processor 120 from the video generated by the camera and the generated depth maps. Other uses for the depth map data include automated processing for use with robotic vision devices.

Figure 2:
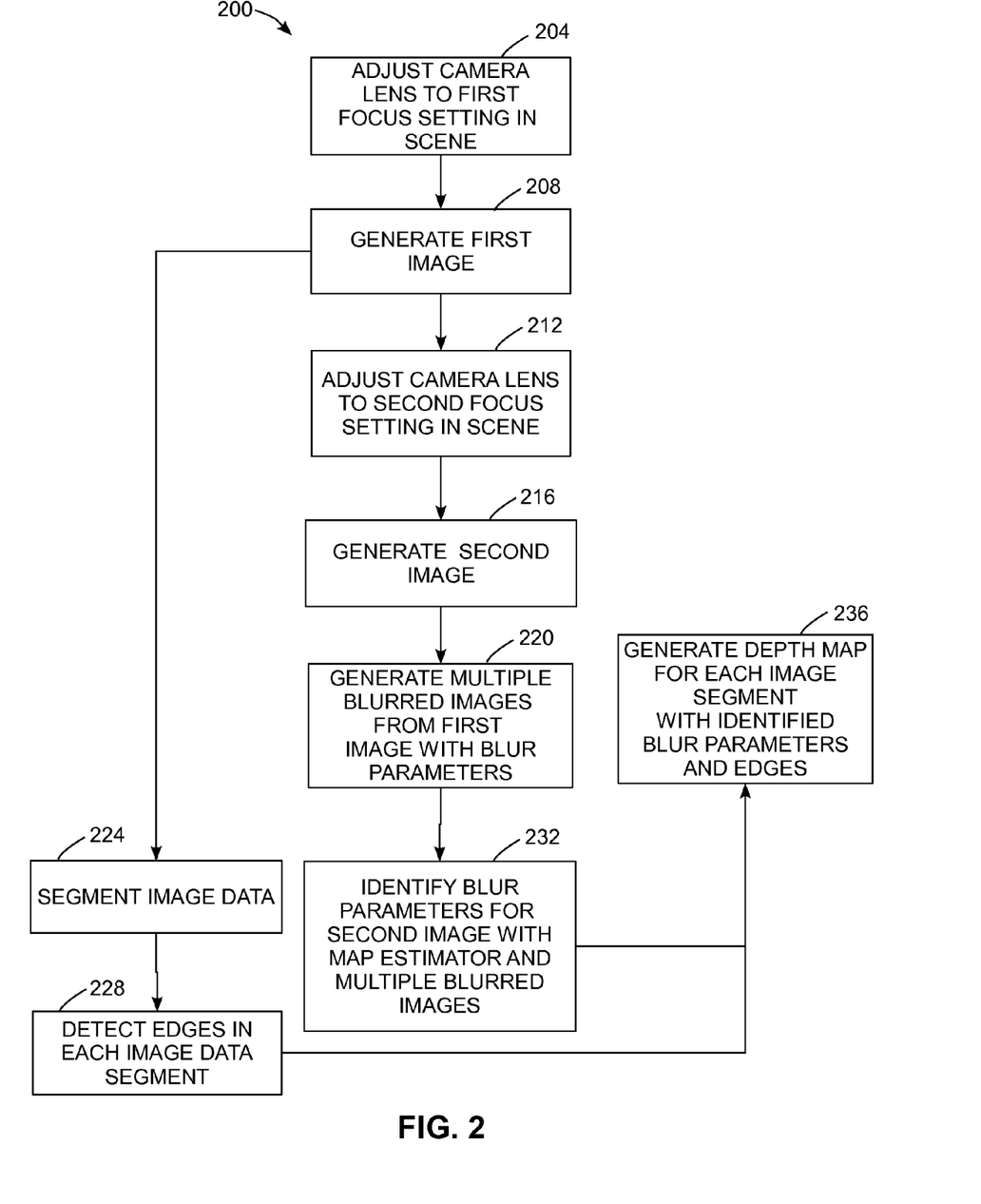
FIG. 2 is a block diagram of a process for segmenting an image and producing a depth map for each segment in the image.

FIG. 2 depicts a process 200 for generating a depth map for a frame of video using a modified version of the depth from defocus technique. As described in more detail below, the process 200 includes a parallelized segmentation and edge detection process to generate depth map data for objects in a scene with improved accuracy over a standard depth from defocus technique. Process 200 is described in conjunction with the image acquisition and processing system 100 of FIG. 1.

Figure 3A:
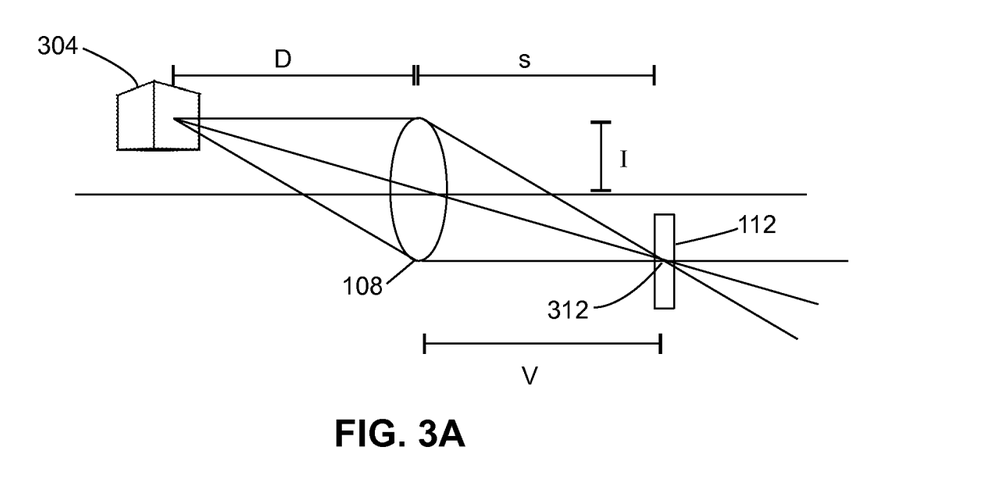
FIG. 3A is a schematic diagram of optics in a camera that is focused on an object.
Figure 4:
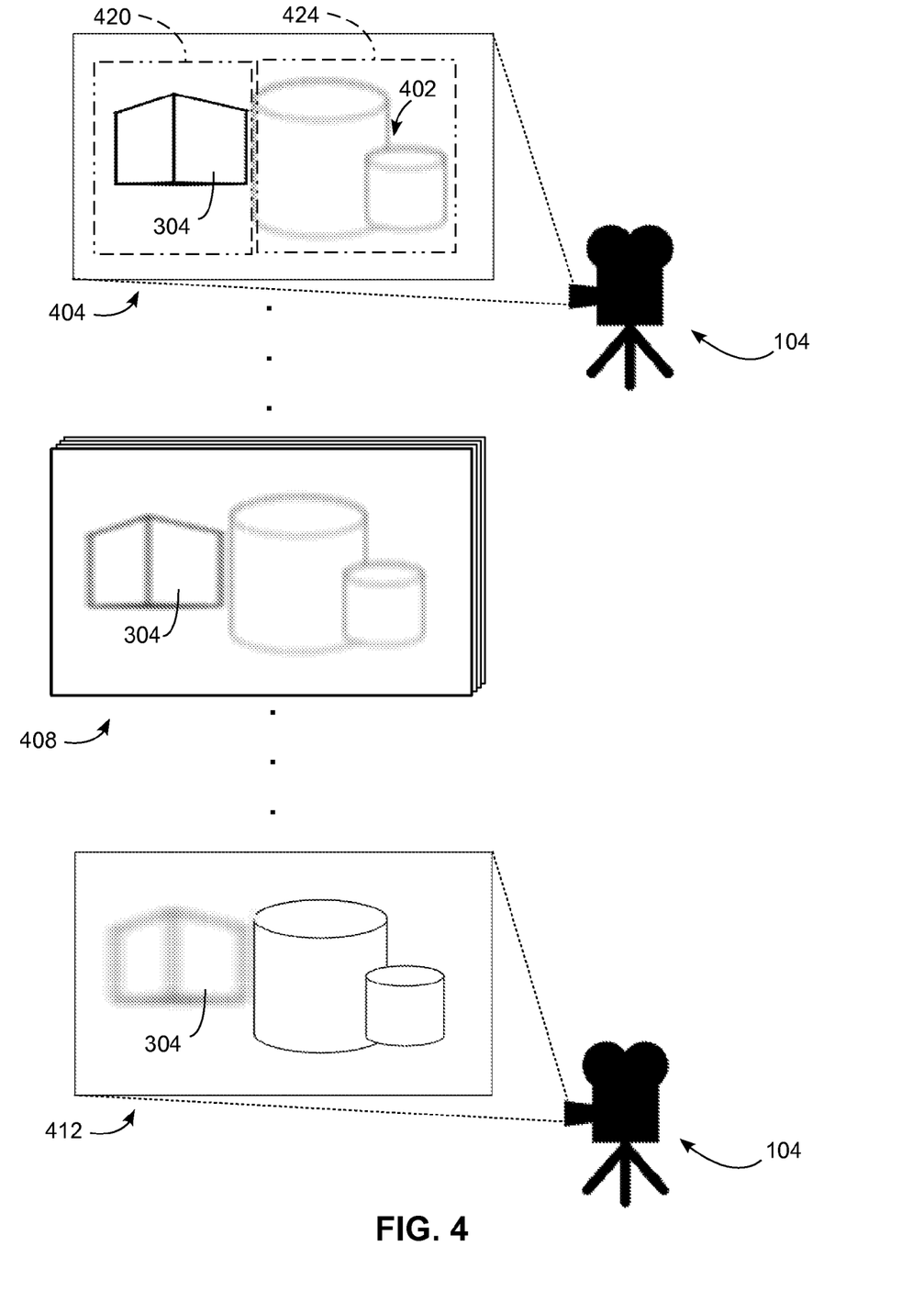
FIG. 4 is a depiction of a series of images generated by a camera of a single scene at multiple focus settings, and images generated using a blur parameter applied to an image generated by the camera.

Process 200 begins by setting a camera to a first focus setting on a scene (block 204). In some embodiments, the first focus setting is selected to focus the camera on an object in a scene, and the process 200 identifies the depth of the focused object from the camera. Depending on the arrangement of objects in the scene, one or more objects may be in focus while other objects are defocused. After the camera is focused on the object, process 200 generates the first image of the scene (block 208). In the system 100, the image sensor 112 generates digital image data and the digital image data are provided to the image data processor 120. As depicted in FIG. 3A, the first focus setting of the lens 108 focuses on an object 304 and the image sensor 112 generates a focused image of the object 304, where the position of a focal point 312 corresponds to the surface of the image sensor 112. FIG. 4 depicts a scene 404 that includes the object 304 as well as objects 402 that have different depths from the camera in the scene. In the scene 404, the camera 104 focuses on the object 304 and the objects 402 are defocused.

Process 200 continues with two parallel operations after generation of the first image. One operation of process 200 performs segmentation of the image data in the first image (block 224) and edge detection of objects in each segment in the image (block 228), while the other operation of process 200, changes the focus of the camera lens to a second focus setting (block 212) and the camera generates a second image of the same scene with the second camera focus setting (block 216). In the image of the scene 404, one exemplary segmentation process of the first operation uses a pyramid segmentation that generates two segments 420 and 424 in the image data. Each of the segments 420 and 424 is formed from pixels selected from the original image in the segmentation process. The edge detection process identifies pixels within each segment that correspond to edges of objects within the segment. For example, the object 304 in segment 420 is depicted as a cuboid with each face in the cuboid having edges that are detected in the segmented image data. The embodiment of FIG. 2 uses a Canny edge detection process to identify edges in each segment, although other embodiments use various edge detection techniques including differential and phase-congruency edge detection techniques. In the embodiment of FIG. 2, process 200 performs blocks 224 and 228 concurrently with a depth from defocus process.

In the embodiment of the system 100, the second operation of the process 200 uses the camera controller 116 to change the focus of the microfluidic lens 108. The amount of change in focus is selected to enable the camera 104 to change focus and generate the second image within a span of time of a single frame in a video sequence. For example, in a 24 FPS video, the camera 104 captures the first image, changes the focus of the lens, and captures the second image in less than 41.7 milliseconds. As described below, the camera controller 116 changes the focus setting on the microfluidic lens 108 by a predetermined amount that is less than the full focus length range of the lens 108 to enable the camera 104 to capture two or more images within the time span of a single frame of video.

Figure 3B:
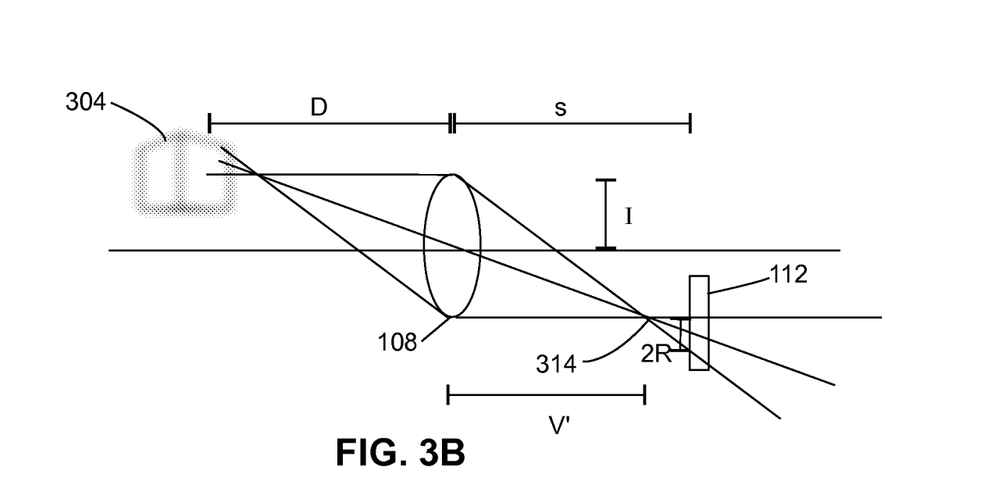
FIG. 3B is a schematic diagram of the optics in FIG. 3A when defocused from the object.

Objects in the second image have a different focus than in the first image. FIG. 4 depicts the scene 412 with a second focus setting. The object 304 is defocused in scene 412. FIG. 3B depicts the defocused configuration of the lens 108 and image sensor 112 in the second image. In FIG. 3B, the light reaches the sensor 112 after passing through a focal point 314, generating a defocused image. A "defocus radius" refers to a linear measurement of the spread of light from the focal point, with a measurement of twice the defocus radius being referred to as the "defocus diameter." The image generated on the image sensor is blurred due to the focus setting of the lens 108 and due to various physical parameters in the camera, including the brightness attenuation of the lens 108. Process 200 generates an estimated blur values for each pixel in the second image in accordance with a two-dimensional Gaussian blur kernel.

Process 200 continues by generating a series of blurred images from the first image using a predetermined set of blur parameters (block 220). Process 200 generates the blurred images using a Gaussian blur with the each of the selected blur parameters. The blur parameters are selected to generate a series of blurred images where at least some of the blurred images correspond to the blur generated in the second image generated by the camera 104. In one embodiment, process 200 generates a series of eight blurred images using a series of eight blur parameters to generate a series of images that have a progressively increasing level of blur. Image 408 in FIG. 4 is an example of one blurred image generated from the first image of scene 404 with a predetermined blur parameter. The blurred images 408 are generated with an image data processor, such as the image data processor 120, using the image data of the focused image, and are not generated directly by the camera 104. The blur parameters selected to blur the first image generate a series of progressively blurred images that include images with less blur and more blur than are present in any segment of the second image. The range of generated blurred images enables process 200 to estimate a blur parameter for different pixels in the second image with reference to the predetermined blur parameters that are used to generate the blurred images. In alternative embodiments where the camera captures more than two images, process 200 generates a series of intermediate blurred images between one of the actual images generated by the camera 104 and progressing toward the next image that the camera generates with a different focus setting. For example, in an embodiment with four images generated with a progressively changing series of focus settings, process 200 generates a series of blurred images between the pair images generated before and after each change in the focus setting.

Process 200 identifies estimated blur parameters for each pixel in the first image with a maximum a posteriori (MAP) estimator of a two-dimensional Markov Random Field including one random variable corresponding to the blur parameter for each pixel in the second image (block 232). The blur parameter generated for one pixel in the second image depends not only on the image data value of the one pixel in isolation, but also in relation to the image data values of neighboring pixels in the image. The Markov Random Field (MRF) model has several properties that enable efficient parallel estimation of blur parameters for all of the pixels in the second image using the parallel computational hardware and software in the image acquisition and processing system 100. First, the MRF has the pairwise Markov property that any two non-adjacent variables are conditionally independent given all other variables, meaning that non-adjacent pixels in the image do not have dependent blur parameter values. Second, the MRF has the local Markov property that the variable of each pixel is independent of all other variables in the field given the neighbors of each pixel. Third, MRF has the global Markov property that any two subsets of variables are conditionally independent given a separating subset. The properties of the MRF enable the parallel hardware to generate estimated blur parameters for multiple groups of pixels concurrently without requiring data dependencies between each pixel in the image.

The MAP estimation technique uses empirical image data present in the series of blurred images to generate an estimate of each random variable and corresponding blur parameter in the MRF of the second image. The MAP estimation represents the second image that includes the defocused object using the following equation: g(x,y)=f(x,y)*h(x,y)+w(x,y) Where x and y are two dimensional coordinates of each pixel in the images, f(x,y) is image data value for each pixel x,y in the first image, h(x,y) is the two-dimensional Gaussian function that generates the blur parameters, and w(x,y) represents noise, which is assumed to be constant for the entire image in some embodiments. The MAP estimation method compares potential parameters of the Gaussian function h(x,y) to the actual blur parameters used to generate the series of blurred images.

An energy function of the MRF is provided with the following equation: $U(S) = \beta \Sigma_{c \in C}^{s} V_c(S) + |g(x,y) - f(x,y)*h(x,y)|^2$ Where S is the MRF, $\beta$ is a weighting factor, and $V_c(S)$ is a function of a clique identifier c defined as: $Vc(S) = \Sigma_c$ prior, The term prior is 1 if a previous pixel has a different clique identifier c than the current pixel, or 0 otherwise. The clique identifier c corresponds to one of the blur parameters used to generate the set of blurred images, and each pixel is classified with one of the blur parameters. Using Bayes' theorem, the MAP estimator generates an estimated blur parameter $\sigma_{x,y}$ for each pixel in the image using the following equation:

$$MAP = \max\left(\frac{P(G = g \mid S = s)P(S = s)}{P(G = g)}\right)$$

where g represents the observed values of the pixels in the second image, and the values of s represent estimated blur parameters in the Markov field that maximize the posterior probability given the observed values in the second image and the series of blurred images. The maximization of the MAP function is mathematically equivalent to minimization of the energy function U(S) over the MRF S. Various computational algorithms, including any of simulated annealing (SA), iterated conditional modes (ICM), and maximization of posterior marginal (MPM), can be used to minimize the energy function U(S) and generate estimated blur parameters $\sigma_{x,y}$ for each pixel in the image.

After the blur parameters are estimated, a naïve approach generates a depth map for each pixel in the first image using the equation $$D = \frac{-v}{\left(\frac{\sigma}{\rho r} - \frac{v}{f} + 1\right)}$$

cited in the background. Process 200, however, generates a depth map using values of selected pixels that are proximate to edges within one or more segments in the first image (block 236). Generating the depth map with edges increases the accuracy of the depth measurements for the objects in the image that include the detected edges. In the example of FIG. 4, the image segment 420 includes pixels representing the object 304. For the cuboid object 304, some of the pixels are further identified as edges of the object. Process 200 generates a depth map of the object 304 using the pixels and corresponding blur parameters that are either identified within the edges of the object 304, or are within a predetermined distance of the edge. For example, the identified depth of each pixel within a horizontal or vertical distance of ten pixels from a detected edge of the object 304 is selected to generate the depth map. Various known smoothing and filtering techniques can be used to reduce the effects of image noise when identifying the depth of the object.

Some embodiments perform various operations of the process 200 in parallel to increase the rate at which depth maps are generated for video frames. As described above, process 200 performs the segmentation and edge detection of the first image in blocks 224 and 228 concurrently with the generation of the blurred images and identification of estimated blur parameters in blocks 220 and 232. Different hardware and software configurations in the image acquisition system 100 perform different operations in the process 200 concurrently to enable generation of depth maps while generating video images of a scene.

Process 200 produces a video with a depth map generated for each frame in the video. As described above, one use for the video and depth map data is to generate 3D images using the 2D image in each video frame and the depth map to produce 3D images using a display device such as the 3D display 128. In various embodiments, the depth map is used to generate a 3D view, including autostereo displays, which take depth and 2D image data as inputs to generate 3D video output that does not require a viewer to wear specially configured eyewear for 3D viewing. With a depth map, different views can be rendered, including left-right stereo for 3D display systems where the viewer wears glasses or other eyewear to perceive the 3D video. Depth is also useful for image compression, where the depth map is used to track objects in a 3D space to improve compression efficiency. Robotic systems use depth map data to find and retrieve objects. Autonomous vehicles use depth map data to avoid obstacles. Various other applications that use video data can also benefit from the video depth map generation described in process 200.

During the generation of a video with a depth map produced using process 200, the focus of the lens 108 in the camera 104 changes at least one time during each video frame to enable the camera 104 to generate at least two images for each video frame. The accuracy of depth maps generated in the depth from defocus method improves within a predetermined range of focus settings that correspond to the focused and defocused images of a scene. In process 200, the range of diopter settings between the focused and defocused images is selected based on multiple operating parameters. First, the diopter range is selected to provide a sufficiently large change in focus between the focused and defocused images to generate the depth map using the depth from defocus method. Second, the diopter range is selected to be small enough to retain sufficient information in the defocused image to identify appropriate blur kernels associated with individual pixels in the focused image and the defocused image. If the diopter range is too large, the defocused image loses too much information about the scene to be useful in associating blur parameters with individual pixels in the defocused scene. Third, the diopter range is selected to enable the microfluidic lens to change focus at least once during the time period of each frame in the video sequence. As described above, one exemplary configuration of process 200 uses focus settings in a range of zero diopters to one diopter, but other camera configurations can use different focus ranges.

While the preferred embodiments have been illustrated and described in detail in the drawings and foregoing description, the same should be considered illustrative and not restrictive. While preferred embodiments have been presented, all changes, modifications, and further applications are desired to be protected.

The invention claimed is:

1. A method of identifying depth information in a frame of a video comprising:
    focusing a microfluidic lens in a camera on an object in a field of view of the camera;
    generating first image data of the field of view that includes a first plurality of pixels corresponding to the object on which the microfluidic lens was focused;
    defocusing the microfluidic lens in the camera from the object;
    generating second image data that includes a second plurality of pixels corresponding to the object on which the microfluidic lens was defocused;
    generating a plurality of blurred images from the first image data with an image data processor, each blurred image in the plurality of blurred images being generated with one blur parameter value in a predetermined plurality of blur parameter values;
    generating, with the image data processor, a plurality of blur parameters with reference to the second plurality of pixels and the plurality of blurred images, each blur parameter in the plurality of blur parameters corresponding to one pixel in the first plurality of pixels;
    identifying, with the image data processor, a depth of the object from the camera in the first image data with reference the plurality of blur parameters; and
    generating a video frame including the first image data and a depth map corresponding to a portion of the first image data and the identified depth of the object from the camera prior to generation of a subsequent video frame.

2. The method of claim 1, the generation of the plurality of blur parameters further comprising:
    generating a random field having a plurality of random variables, each random variable corresponding to one of the plurality of blur parameters and having a range of values corresponding to the predetermined plurality of blur parameter values; and
    generating, with the image data processor, the plurality of blur parameters with reference to the plurality of random variables in the random field and the second plurality of pixels where the plurality of blur parameters maximizes a posterior probability of the random field with reference to the second plurality of pixels.

3. The method of claim 2, the generation of the plurality of blur parameters further comprising:
    performing a maximum a posteriori optimization with the image data processor.

4. The method of claim 3 wherein the maximum a posteriori optimization is an iterated conditional modes optimization.

5. The method of claim 3 wherein the maximum a posteriori optimization is a simulated annealing optimization.

6. The method of claim 3 wherein the maximum a posteriori optimization being a maximization of posterior marginal optimization.

7. The method of claim 1, the identification of the depth of the object from the camera in the first image data being made with further reference to a focal length of the camera, a distance between the microfluidic lens and an image detector in the camera, a radius of the microfluidic lens, and a predetermined camera constant.

8. The method of claim 1, the microfluidic lens having a first focus distance when the camera generates the first image data and a second focus distance when the camera generates the second image data, the microfluidic lens being configured to change from the first focus distance to the second focus distance in less than 17 milliseconds.

9. The method of claim 8 wherein a difference between the first focus distance and the second focus distance of the microfluidic lens is less than a difference between a maximum focus distance and a minimum focus distance of the microfluidic lens.

10. The method of claim 1, further comprising:
    generating a plurality of segments in the first image data with the image processor, one segment in the plurality of segments including a portion of the first plurality of pixels corresponding to the object; and
    identifying, with the image processor, the depth of the object with reference to the pixels in the one segment and blur parameters in the plurality of blur parameters corresponding to the pixels in the one segment.

11. A digital imaging system comprising:
    a camera having a microfluidic lens and an image detector, the microfluidic lens being configured to have a range of focus distances and the image detector being configured to generate image data corresponding to light reaching the image detector through the microfluidic lens; and
    an image data processor operatively connected to the microfluidic lens and the image detector in the camera, the image data processor being further configured to:
        focus the microfluidic lens on an object within a field of view of the camera;
        generate first image data that includes a first plurality of pixels corresponding to the object on which the microfluidic lens was focused;
        defocus the microfluidic lens from the object;
        generate second image data that includes a second plurality of pixels corresponding to the object on which the microfluidic lens was defocused;
        generate a plurality of blurred images from the first image data, each blurred image in the plurality of blurred images being generated with one blur parameter value in a predetermined plurality of blur parameter values;
        generate a plurality of blur parameters with reference to the second plurality of pixels and the plurality of blurred images, each blur parameter in the plurality of blur parameters corresponding to one pixel in the first plurality of pixels; and
        identify a depth of the object from the camera in the first image data with reference to the plurality of blur parameters.

12. The digital imaging system of claim 11, the image data processor being further configured to:
    generate a random field having a plurality of random variables, each random variable corresponding to one of the plurality of blur parameters and having a range of values corresponding to the predetermined plurality of blur parameter values; and
    generate the plurality of blur parameters with reference to the plurality of random variables in the random field and the second plurality of pixels where the plurality of blur parameters maximizes a posterior probability of the random field with reference to the second plurality of pixels.

13. The digital imaging system of claim 12, the image data processor being configured to generate the plurality of blur parameters with a maximum a posteriori optimization.

14. The digital imaging system of claim 13 wherein the maximum a posteriori optimization is an iterated conditional modes optimization.

15. The digital imaging system of claim 13 wherein the maximum a posteriori optimization is a simulated annealing optimization.

16. The digital imaging system of claim 13 wherein the maximum a posteriori optimization is a maximization of posterior marginal optimization.

17. The digital imaging system of claim 11, the image data processor being further configured to:
identify the depth of the object from the camera in the first image data with further reference to a focal length of the camera, a distance between the microfluidic lens and the image detector in the camera, a radius of the microfluidic lens, and a predetermined camera constant.

18. The digital imaging system of claim 11, the microfluidic lens having a first focus distance when the image detector generates the first image data and a second focus distance when the image detector generates the second image data, the microfluidic lens being configured to change from the first focus distance to the second focus distance in less than 17 milliseconds.

19. The digital imaging system of claim 18 wherein a difference between the first focus distance and the second focus distance of the microfluidic lens is less than a difference between a maximum focus distance and a minimum focus distance of the microfluidic lens.

20. The digital imaging system of claim 11, the image data processor being further configured to:
generate a plurality of segments in the first image data with the image processor, one segment in the plurality of segments including a portion of the first plurality of pixels corresponding to the object; and
identify the depth of the object with reference to the pixels in the one segment and blur parameters in the plurality of blur parameters corresponding to the pixels in the one segment.

* * * * *